Jan. 26, 1960    E. HAHN ET AL    2,922,347
EXPOSURE REGULATOR
Filed March 6, 1957
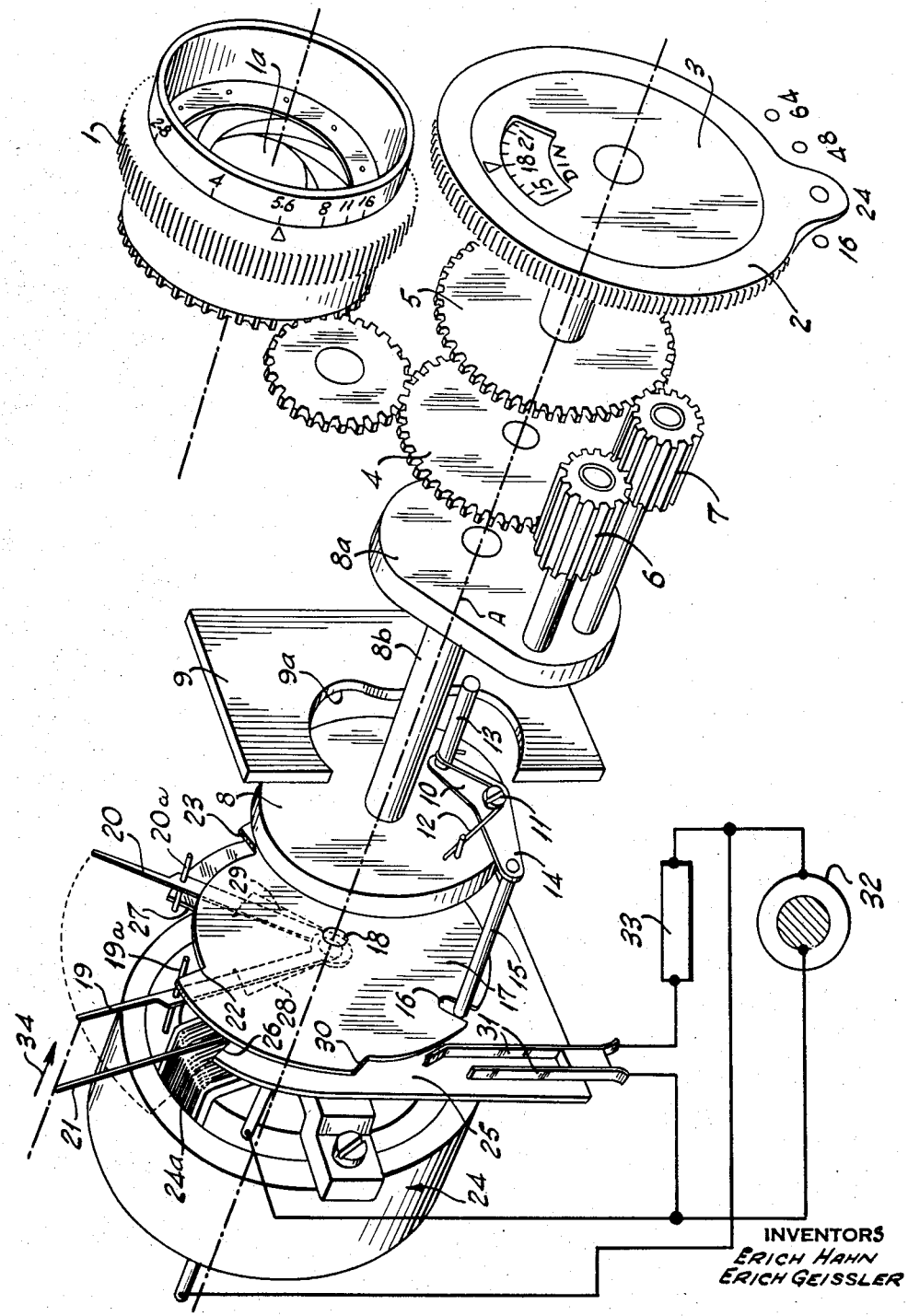
INVENTORS
ERICH HAHN
ERICH GEISSLER United States Patent Office 2,922,347
Patented Jan. 26, 1960

2,922,347
EXPOSURE REGULATOR
Erich Hahn and Erich Geissler, Dresden, Germany, assignors to VEB Zeiss Ikon Dresden, Dresden, Germany
Application March 6, 1957, Serial No. 644,384
Claims priority, application Germany May 16, 1956
6 Claims. (Cl. 95—10)

This invention relates to photoelectric light or exposure meters and regulators, and in particular to instruments of this type equipped with cam-controlled setting or adjustment indicators, as well as with means defining a plurality of measuring ranges.

Enhancement and widening of the measuring ranges of a light meter is usually effected by positioning filters or diaphragms in front of the light-sensitive photoelectric cell or element, by switching additional photoelectric cells into or out of operation, and by switching resistances into and out of the current circuit connected to the photoelectric cell or cells. In light or exposure meters, moreover, it is known to provide different, usually concentric scales for the various measuring ranges. This, however, can easily lead to errors in reading the desired value, so that it has become customary to combine with the shifting of the instrument from one range to the other a corresponding shifting of the scales or of the indicia thereof.

These known expedients, however, are applicable only to light meters which are not coupled to the camera, but not to light meters which are coupled to the camera and which are identified and employed as semi-automatic exposure regulators.

The principle of using a cam-controlled setting indicator (the term "setting indicator" or "adjustment indicator" being employed to designate an indicator which shows the state of adjustment, i.e., the setting, of certain control parts of the camera) has not heretofore been applied to light or exposure meters and regulators having a plurality of measuring ranges, since implementation of this principle necessitates the use of two setting indicators and above all of two separate correction cams or cam surfaces for controlling the setting indicators. The construction of light meters would thus tend to become very complicated.

One of the principal objects of the present invention, therefore, is to overcome the aforesaid drawbacks and disadvantages and to adapt multi-range light or exposure meters and regulators to use with a cam-controlled dual setting or adjustment indicator system.

Another important object of the present invention is a transmission mechanism through the intermediary of which one and/or the other of two setting or adjustment indicators can be moved through a limited angle to a predetermined position to ensure that the means which is employed to operate the transmission is, when the indicator reaches said position, disposed in a desired correct operational state corresponding to the setting of the indicator.

It is also an object of the invention to provide a mechanism of the aforesaid type in which only one cam or cam surface is employed to control both setting indicators.

A further object of the invention is the provision of a novel and highly efficacious combined light meter and exposure regulator in which the meter pointer, the setting or adjustment indicators and the means sensing the control cam surface are all mounted for rotation about a common axis.

Yet a further object of the present invention is a combined meter and regulator as aforesaid which is simple in construction, relatively small in overall size and easy as well as inexpensive to manufacture.

Still another object of the present invention is to provide additional cam means in association with the setting or adjustment indicators, such additional cam means serving to switch the light meter from one of its measuring ranges to the other.

More specifically, the need for two separate correction cams is eliminated if use is made of an arrangement in which a two-armed control element, one arm of which senses a control surface of a correction cam fixed to the housing of the meter (and of the camera), is journaled on the calculating disc of the meter or on a disc coupled with the exposure setting members of the camera and, in accordance with the invention, has its other arm disposed to control two setting indicators adapted to the different measuring ranges. The single correction cam employed thus constitutes a common and the only means for controlling both setting or adjustment indicators over their entire ranges of movement.

In order to maintain the structural dimensions of a light or exposure meter corresponding to the aforesaid principles as small as possible, the two setting indicators are, in accordance with a further characteristic of the invention, mounted for rotation about the center of a disc which is coupled directly to the free or indicator-actuating arm of the control element and provided with two spaced abutments facing one another for contact with the setting indicators. These movable abutments effect, during rotation of the disc, a sequential entraining of the indicators contacting said abutments into rotation, the extent or total angle of rotation being limited by two stationary abutments fixed to the housing. By virtue of this structural arrangement, the indicators move in a path corresponding in length to the length of the scale of the instrument, as distinguished from heretofore known arrangements employing indicators coupled directly to the setting means where a path twice as long was required.

Switching from one of the two measuring ranges to the other occurs, according to a further characteristic of the invention, through the intermediary of an additional cam disposed on the disc carrying the setting indicators or on the disc carrying the control element, which cam actuates a pair of electric contacts arranged to switch a resistance connected in parallel with the instrument coil or the photocell into or out of the electric circuit.

The invention is more fully described hereinbelow with reference to the accompanying drawing, showing in a schematic manner one embodiment of the setting or adjustment indicator system constituting, by way of example, a part of a so-called semi-automatic exposure regulator, i.e., a light meter combined with a camera.

Referring now more particularly to the drawing, the camera and light meter combination is enclosed in a common housing (not shown). The camera is equipped with exposure setting means including adjusting means 1 for setting the diaphragm opening 1a, further adjusting means 2 for setting the camera, if of the motion picture type, for a predetermined picture sequence rate, e.g. 16, 24, 48 or 64 pictures per second, and additional adjusting means 3 for setting the camera in accordance with the film sensitivity.

The various exposure setting means are coupled to a differential planetary gear transmission including coaxial sun gears 4 and 5 and planet gears 6 and 7 carried by a member 8a mounted on a shaft 8b, the planet gears thus being mounted for revolution about the axis A of the shaft 8b. The latter carries at its end remote from the member 8a a disc 8 on which a two-armed control element 10 provided at one arm with a feeler 13 for sensing the control contour or surface 9a of a correction cam 9 fixed to the housing of the instrument is rotatably journaled at 11. The feeler 13 is pressed against the cam surface 9a by means of a spring 12. The free arm 14 of the control element 10 carries a coupling pin 15 engaging in a slot 16 of a disc 17 rotatable about the axis A.

Mounted for rotation about the axle 18 of the disc 17 are two setting indicators 19 and 20 which in operation are to be brought into coincidence or alignment with a pointer 21 fixed to the rotary coil 24a of the measuring mechanism 24 of the light meter associated with the camera. The disc 17 is recessed over a part of its periphery, whereby two spaced abutments 22 and 23 facing one another are formed. Between the measuring mechanism 24 and the disc 17 is arranged a plate 25 which is fixed to the housing of the instrument and provided with two stationary abutments 26 and 27. The two setting indicators 19 and 20 are biased, respectively, by means of springs 28 and 29 toward the abutments 22, 26 and 23, 27, the indicators being provided with transversely extending contact pins 19a and 20a engageable with the respective abutments. On the disc 17 is further provided a cam 30 which actuates a pair of electric contacts 31 for the purpose of switching a resistance 33 connected in parallel to the coil 24a of the measuring mechanism and to the photocell into and out of the measuring circuit.

The pointer 21 is viewed in the direction of the arrow 34, so that the null position of the pointer is at the right in the drawing. It will be noted that the pointer 21, like the indicators 19 and 20, the discs 17 and 8 and the sun gears 4 and 5, is arranged for rotary movement about the axis A.

The operation of the system is as follows:

Assuming that the object to be photographed is relatively dark or unilluminated and that as a consequence thereof it is necessary to employ the measuring range of greatest sensitivity, the pointer 21 of the light meter will assume a position such as shown in the drawing, for example. By adjustment of the diaphragm opening or the picture frequency by the means 1 or 2, for example, a rotary motion is imparted via the differential planetary gear transmission to the disc 8 and from the latter to the disc 17 via the control element 10 and coupling pin 15. The feeler or sensing pin 13 glides along the surface 9a of the cam 9 so as to rock the control element 10 about its pivot 11. The free arm 14 of the control element 10, through the intermediary of the coupling pin 15, thus imparts an additional rotation to the disc 17, which additional rotation is superimposed on the rotation resulting from setting of the adjusting means 1 or 2. The sum of the two rotations determines the total movement of the disc 17, which movement must be properly adapted to the operating characteristics of the photo-sensitive element 32 and the measuring mechanism 24 as related to predetermined, constant ratio changes of the illumination to be measured. The setting indicator 19, which at this time is pressed against the movable abutment 22 by the spring 28, follows the rotation of the disc 17. The setting is completed when the indicator 19 is brought into coincidence or alignment with the pointer 21, and the picture can now be taken since the camera will be set for the prevailing light conditions. If the instrument is thereafter shifted to a much more illuminated object to be photographed, the measuring pointer 21 will be deflected all the way to its left-hand end position as seen in the drawing. The setting indicator 19 is now displaced in a direction tending to bring it into alignment with the pointer at this end position by suitable operation of the adjusting means 1 and/or 2. However, the movement of the indicator 19 is limited by engagement of the pin 19a with the abutment 26 fixed to the housing, and the terminal point of movement of the indicator 19 may be located at or before the extreme lefthand end position of the pointer 21. At this instant, the abutment 23 formed on the disc 17 comes into contact with the contact pin 20a of the second setting indicator 20 which until then was retained in its starting position against the abutment 27.

Simultaneously, the cam 30 closes the contacts 31 which causes the resistance 33 to be connected in parallel with the coil 24a of the measuring mechanism 24, so that the pointer 21 moves from its maximum deflection position to an intermediate value. The setting indicator 20 is now further displaced by manipulation of the adjusting means 1 and/or 2 until it comes into coincidence or alignment with the pointer 21, at which time the picture may be taken with the assurance that the diaphragm opening is again at the proper value.

It will, of course, be understood that the herein disclosed exposure regulator is capable of being modified in a number of ways without departing to any extent from the scope of the invention as defined by the appended claims, and it is intended that the present invention not be limited except as set forth in said claims. By way of example, the cam 9 may be positioned between the discs 8 and 17, in which case the control element 10 would be pivoted to that face of the disc 8 facing the disc 17. The control element 10 could be pivoted to the disc 17 and the slot or notch 16 formed in the disc 8. Accordingly, the cam 9 could even be positioned between the disc 17 and the plate 25, provided its position was such as not to interfere with the angular displacements of the setting indicators 19 and 20.

What we claim is:

1. In a camera equipped with adjusting means for exposure setting, an exposure regulator comprising multi-range photoelectric light measuring means including a pointer for indicating the extent of illumination of an object being photographed, a plurality of setting indicators each associated with a respective measuring range of said measuring means, and transmission means operatively interconnecting said adjusting means and said setting indicators and operable in response to actuation of said adjusting means for moving a selected one of said setting indicators into alignment with said pointer at the position thereof corresponding to the extent of illumination of said object as sensed by said photoelectric measuring means, said transmission means including cam-controlled means for adapting the movements of all of said setting indicators to the operating characteristics of said photoelectric light measuring means, and said transmission means comprising first and second coaxial, rotatable discs, gear means directly coupling said first disc to said adjusting means, said setting indicators being two in number and carried by said second disc, a two-armed control element pivotally connected intermediate its arms to one of said first and second discs, and coupling means interconnecting one of said arms of said control element with the other of said first and second discs, the other arm of said control element constituting said cam-controlled means, whereby rotation of said first disc is transmitted in a regulated manner to said second disc via said coupling means and thence to said setting indicators.

2. In a camera according to claim 1; said second disc being provided with a pair of peripherally spaced abutments movable therewith and engageable with said setting iindicators, respectively, spring means biasing said setting indicators away from one another about the axis of said second disc and toward said movable abutments, and a pair of stationary spaced abutments located adjacent said second disc for engagement by said setting indicators and defining the extent of maximum displacement of each of said setting indicators by said movable abutments.

3. In a camera according to claim 2; a cam provided on one of said first and second discs and movable therewith, said measuring means comprising a rotary coil, photo-electric cell means electrically connected in circuit with said coil, a range-changing resistance connected in parallel with said coil and said photoelectric cell means, and electric contact means positioned in the path of movement of said cam for actuation by the latter to connect said resistance into and out of said circuit, respectively, during rotation of said second disc.

4. In a camera equipped with adjusting means for exposure setting, an exposure regulator comprising multi-range photoelectric light measuring means including a pointer for indicating the extent of illumination of an object being photographed, a plurality of setting indicators each associated with a respective measuring range of said measuring means, and transmission means operatively interconnecting said adjusting means and said setting indicators and operable in response to actuation of said adjusting means for moving a selected one of said setting indicators into alignment with said pointer at the position thereof corresponding to the extent of illumination of said object as sensed by said photo-electric measuring means, said transmission means including cam-controlled means for adapting the movements of all of said setting indicators to the operating characteristics of said photoelectric light measuring means; said transmission means comprising a pair of coaxial, rotatable discs, gear means directly coupling one of said discs to said adjusting means, the other of said discs carrying said setting indicators, a two-armed control element pivotally connected intermediate its arms to said one disc adjacent the periphery thereof, and coupling means interconnecting one of said arms of said control element with said other disc, the other arm of said control element constituting said cam-controlled means.

5. In a camera equipped with adjusting means for exposure setting, an exposure regulator comprising multi-range photoelectric light measuring means including a pointer for indicating the extent of illumination of an object being photographed, a plurality of setting indicators each associated with a respective measuring range of said measuring means, and transmission means operatively interconnecting said adjusting means and said setting indicators and operable in response to actuation of said adjusting means for moving a selected one of said setting indicators into alignment with said pointer at the position thereof corresponding to the extent of illumination of said object as sensed by said photoelectric measuring means, said transmission means including cam-controlled means for adapting the movements of all of said setting indicators to the operating characteristics of said photoelectric light measuring means; said transmission means comprising a pair of coaxial, rotatable discs, gear means directly coupling one of said discs to said adjusting means, the other of said discs carrying said setting indicators, a two-armed control element pivotally connected intermediate its arms to said other disc adjacent the periphery thereof, and coupling means interconnecting one of said arms of said control element with said one disc, the other arm of said control element constituting said cam-controlled means.

6. In a camera equipped with adjusting means for exposure setting, an exposure regulator, comprising dual-range photoelectric light measuring means including an angularly displaceable pointer for indicating the extent of illumination of an object being photographed, a pair of angularly displaceable setting indicators mounted coaxially with said pointer and each associated with a respective measuring range of said measuring means, cam means provided with a control surface, transmission means operatively interconnecting said adjusting means and said setting indicators and operable in response to actuation of said adjusting means for angularly displacing a selected one of said setting indicators about its axis, and feeler means sensing said control surface of said cam means and operatively connected to said transmission means for modifying the operation thereof so as to adapt the displacements of said setting indicators in accordance with the contours of said control surface to the operating characteristic of said photoelectric light measuring means, said transmission means comprising first and second rotatable discs arranged coaxially with one another, said pointer and said setting indicators, gear means directly coupling said first disc to said adjusting means, said setting indicators being carried by said second disc and angularly displaceable relative thereto, a two-armed control element pivotally connected intermediate its arms to one of said first and second discs, and coupling means interconnecting one of said arms of said control element with the other of said first and second discs, said feeler means being connected to the other arm of said control element, whereby rotation of said first disc is transmitted in a regulated manner to said second disc via said coupling means and thence to said setting indicators.

References Cited in the file of this patent
UNITED STATES PATENTS

| | | |
|---|---|---|
| 2,241,020 | Nerwin | May 6, 1941 |
| 2,739,506 | Stimson et al. | Mar. 27, 1956 |

FOREIGN PATENTS

| | | |
|---|---|---|
| 179,192 | Austria | July 26, 1954 |
| 184,058 | Austria | Dec. 10, 1955 |

OTHER REFERENCES

Kodak, German application Ser. No. K22850, printed Dec. 13, 1956 (Kl. 57a, 32).